United States Patent
Rothschink

(10) Patent No.: US 6,535,112 B1
(45) Date of Patent: Mar. 18, 2003

(54) DIAGNOSTIC TEST DEVICE FOR MOTOR VEHICLES WHICH COMPRISES A PORTABLE TESTING APPARATUS

(75) Inventor: Martin Rothschink, Kirchheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/743,584

(22) PCT Filed: May 10, 2000

(86) PCT No.: PCT/DE00/01443

§ 371 (c)(1),
(2), (4) Date: Mar. 8, 2001

(87) PCT Pub. No.: WO00/68660

PCT Pub. Date: Nov. 16, 2000

(30) Foreign Application Priority Data

May 11, 1999 (DE) ............................ 199 21 846

(51) Int. Cl.⁷ ................................. B60Q 1/00
(52) U.S. Cl. .................... 340/425.5; 324/402
(58) Field of Search ............. 702/188; 340/425.5, 340/438, 439; 324/402; 701/29; 73/116

(56) References Cited

U.S. PATENT DOCUMENTS

| | | |
|---|---|---|
| 4,467,323 A | 8/1984 | Kling et al. |
| 4,602,127 A | 7/1986 | Neely et al. |
| 4,671,111 A | 6/1987 | Lemelson |
| 5,437,163 A | 8/1995 | Jurewicz et al. |
| 5,442,553 A * | 8/1995 | Parrillo ............... 702/188 |
| 5,541,840 A | 7/1996 | Gurne et al. |
| 5,608,657 A | 3/1997 | Conway |

FOREIGN PATENT DOCUMENTS

| | | |
|---|---|---|
| DE | 44 46 512 | 6/1996 |
| DE | 195 37 074 | 4/1997 |
| JP | 09 163008 | 6/1997 |
| WO | 94 28635 | 12/1994 |

* cited by examiner

Primary Examiner—Christine Oda
(74) Attorney, Agent, or Firm—Kenyon & Kenyon

(57) ABSTRACT

A diagnostic test system having a portable testing device for motor vehicles, controllers having an on-board diagnostic device being provided which control and monitor the engine control system and other systems of the vehicle, generate and store error codes, and which can be connected to an external testing device via a motor vehicle-side diagnosis/test plug. The external portable testing device is equipped with a modem and connected to a mobile telephone, a hand-held cell phone in particular, in order to perform error diagnosis and troubleshooting in such an interconnected network outside stationary repair shops.

3 Claims, 1 Drawing Sheet

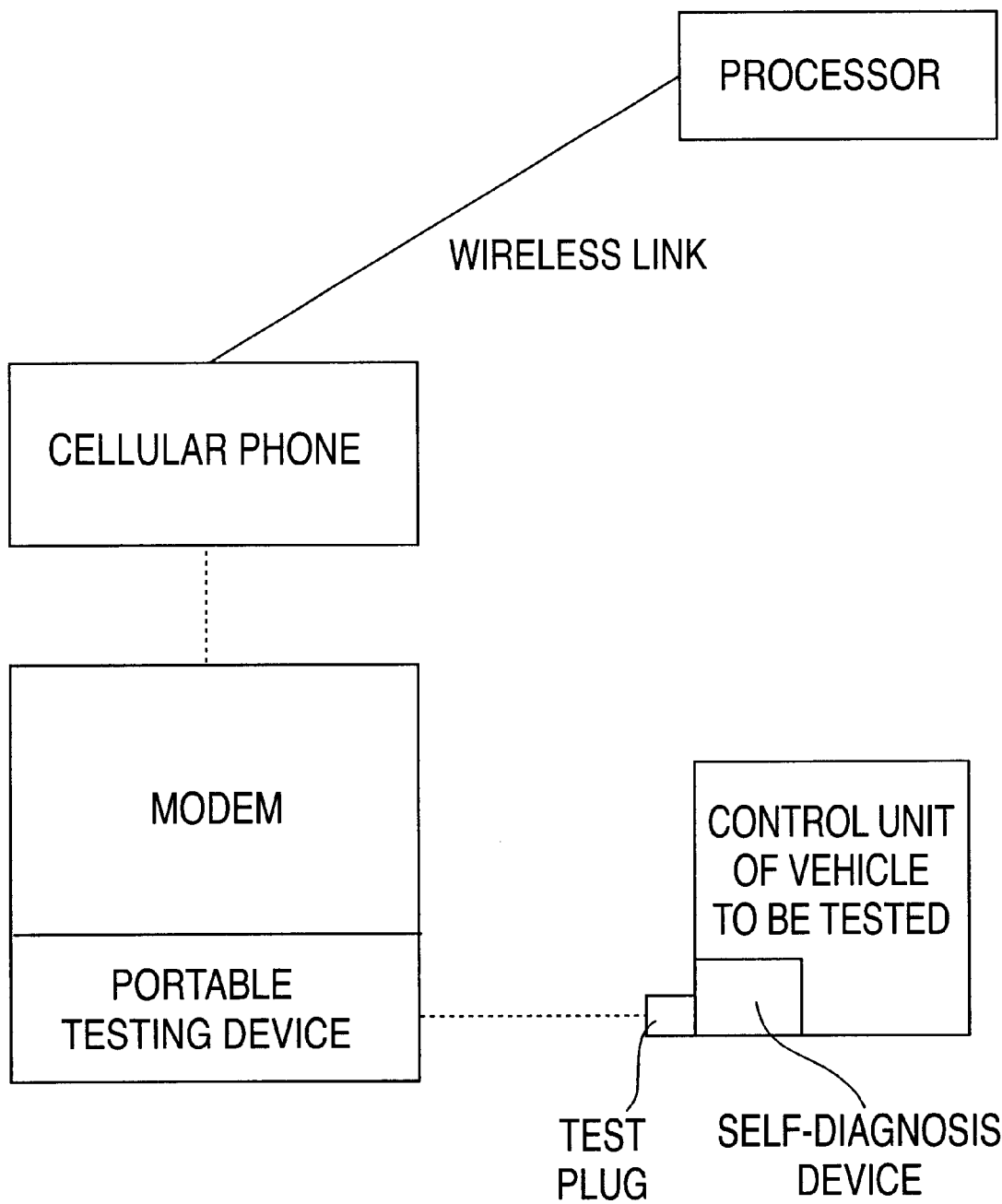

DIAGNOSTIC TEST DEVICE FOR MOTOR VEHICLES WHICH COMPRISES A PORTABLE TESTING APPARATUS

BACKGROUND INFORMATION

Diagnostic test systems for motor vehicles containing controllers are generally known. Such controllers may contain on-board diagnostic means. They control and monitor the engine control system and other systems of the motor vehicle. In on-board diagnosis, error codes are generated and subsequently stored. These controllers and the error code memory can be connected to an external diagnostic tester via a motor vehicle-side diagnosis/test plug.

German Patent Application No. 44 46 512 describes a system for performing vehicle tests in which the terminal of the vehicle-side diagnosis/test plug is not connected to a diagnostic tester located in the repair shop via a cable, but via a telephone located in the vehicle itself, so that the error diagnosis codes are transmitted via the mobile wireless network to a location in a repair shop which then performs the test. Thus repair shop stays can be avoided and tests can also be performed with the vehicle in motion. This known device thus replaces the normal cable connection between vehicle and diagnostic tester in the repair shop with mobile communication.

SUMMARY OF THE INVENTION

The diagnostic test system according to the present invention having a portable testing device for vehicles, has the advantage over the related art in that it allows global interconnection of the testing device with the motor vehicle, making access to private and public networks, for example, possible. Thus, existing devices can be utilized in a worldwide combination and used for troubleshooting motor vehicles in the field, which would otherwise not be possible without utilizing the infrastructure of mobile wireless services.

According to the present invention, this is achieved in principle by equipping the external portable testing device with a modem and connecting it to a mobile telephone, a hand-held cell phone in particular, in order to troubleshoot via such an interconnected network outside stationary repair shops.

According to an advantageous embodiment of the diagnostic test system according to the present invention, the portable testing device provided with a modem is located in repair and service vehicles of on-the-road automobile clubs, such as ADAC road monitoring vehicles in particular.

BRIEF DESCRIPTION OF THE DRAWING

The FIGURE shows a testing system in accordance with an example embodiment of the present invention.

DETAILED DESCRIPTION

According to the present invention, a portable testing device is equipped with a modem. Thus, a portable testing device can be connected to a mobile telephone, a cell phone in particular, in this interconnected configuration via private or public networks; it can be connected to a location from which processing of the reported error codes and troubleshooting instructions can be expected. This makes it possible to utilize the existing devices in a combination which is possible only through the infrastructure of mobile wireless services. It is advantageous that such portable testing devices having a modem which are used outside a repair shop are used in services such as, for example, mobile repair and service vehicles of automobile clubs, such as ADAC road monitoring vehicles in particular.

Thus the present invention creates a very flexible option for performing remote diagnoses in the field using simple means, so that help can be promptly provided for the driver and his vehicle.

What is claimed is:

1. A diagnostic test system comprising:

an external portable motor vehicle testing device disposed in a mobile repair and services vehicle, the testing device configured to connect to a controller in a second motor vehicle via a vehicle-side diagnosis/testing plug, the controller in the second motor vehicle having an on-board diagnostic device and controlling and monitoring systems of the second motor vehicle and generating and storing error codes, the testing device being equipped with a modem and coupled to a cellular telephone, the testing device configured to couple to a processor via the cellular telephone, the processor performing error diagnosis and troubleshooting with respect to the second vehicle.

2. The diagnostic test system according to claim 1, wherein the mobile repair and services vehicle is an automobile club vehicle.

3. The diagnostic test system according to claim 1, wherein the mobile repair and services vehicle is an ADAC road monitoring vehicle.

\* \* \* \* \*